March 8, 1938.  J. F. WENTZ  2,110,457

UNDERSEA CABLE SYSTEM

Filed March 28, 1936

INVENTOR
J. F. WENTZ
BY
*J. W. Schmied*
ATTORNEY

Patented Mar. 8, 1938

2,110,457

UNITED STATES PATENT OFFICE 2,110,457

UNDERSEA CABLE SYSTEM

Jesse F. Wentz, New York, N. Y., assignor to Bell Telephone Laboratories, Incorporated, New York, N. Y., a corporation of New York Application March 28, 1936, Serial No. 71,395

6 Claims. (Cl. 173—268)

This invention relates to deep sea cable systems and more particularly to housings for apparatus employed in undersea cable systems.

The object of this invention is to house repeating and other apparatus required in undersea cable systems in a container which is substantially impervious to water at both high and low pressures and which possesses sufficient flexibility to withstand the bending it will encounter during the laying of the undersea cable system.

Since Cyrus W. Field in 1858 laid the first Atlantic cable the advance and improvements in the undersea cable communication systems have been many. One such improvement suggested in recent years is the use of repeater stations on the ocean bottom which are adapted to be laid with the undersea cable as described in U. S. Patent 2,020,297 granted to O. E. Buckley and O. B. Jacobs on November 12, 1935. However, the housings in which these repeaters and other apparatus are inserted have heretofore been of rigid design. Since in the laying of an undersea cable from a cable ship the cable is bent around at least one drum, the cable laying operation must be interrupted and the cable spliced and connected to the terminals of the housing at points where repeaters or other apparatus are required. This procedure results in considerable loss of time in the laying of the cable and is mechanically difficult at great depths.

In accordance with a feature of this invention the electrical apparatus required for undersea communication is housed in a flexible container which may be bent around the drums employed in the laying of the cable. The flexible container is capable of withstanding the pressures encountered in deep sea depths. A pliant covering which is substantially impervious to water surrounds the container.

In accordance with another feature of this invention water is prevented from entering the container at both high and low pressures. When the housing is being lowered for laying on the sea bottom, variations in the sea pressure are encountered. The housing in accordance with this invention is capable of withstanding all of the variations in the sea pressure.

A more comprehensive understanding of this invention is obtained by reference to the accompanying drawing in which.

Figure 1:
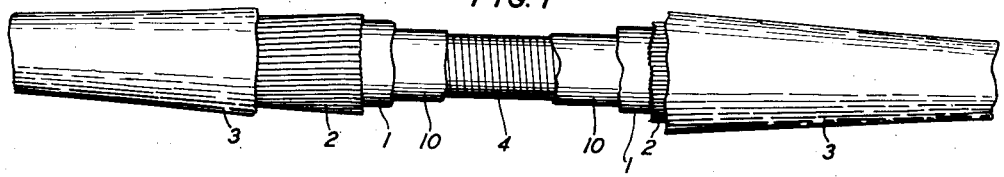
Fig. 1 shows a view of the housing constructed in accordance with this invention.

Fig. 1 shows a view partly broken away of the housing constructed in accordance with this invention. The housing comprises a helix 4 of steel or other material which is capable of withstanding deep sea pressures. A pliable copper tube 10 covers the helix 4. The tube 10 may be constructed of other material which is pliable and impervious to water. A layer of jute 1 is wound around the copper tube 10. Over the jute 1 armor wire 2 is placed. The armor wire 2 is similar to that employed in the construction of submarine cables. Another layer of jute 3 is wound around the armor wire 2.

Figure 2:
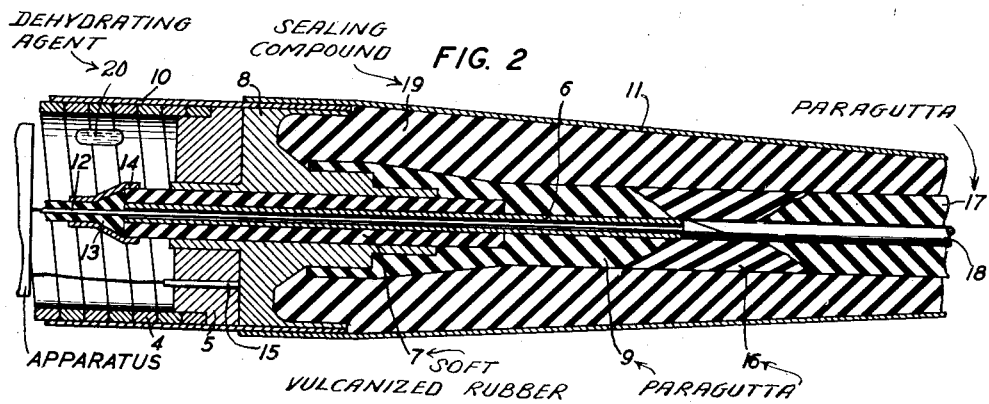
Figs. 2 and 3 are sectional views of the ends of the housing shown in Fig. 1.

In Fig. 2 the end of the housing illustrated in Fig. 1 is shown. The housing comprises the steel helix 4 which serves as a supporting structure. A steel end plate 5 is so disposed to the helix 4 that the plate supports the end of the helix radially, while the helix supports the plate longitudinally. A hollow central conductor 6 which is adapted to be connected to the central conductor of the cable passes through the steel end plate 5 and is insulated therefrom by means of a soft rubber insulator 7. The rubber insulator 7 is vulcanized to the hollow central conductor 6 and to a container end cap 8 which also serves as an outer conductor. The end cap 8 is preferably constructed so that it is supported by the steel end plate 5. Paragutta or other insulation 9 which is capable of being connected to the insulation of the armored cable is formed around the insulator 7 and the outer conductor or end cap 8. Insulation 9 is placed around the insulator 7 and the outer conductor 8 before the vulcanization of the insulator 7. The paragutta 9 comprises 40 per cent deresinated balata, 50 per cent deproteinized rubber and 10 per cent Superla wax. During the vulcanization of the insulator 7, the compound 9 adheres to the insulator. An annealed copper jacket 10 which is impervious to water and which may be in direct contact with sea water completely surrounds the steel helix 4 and extends completely over the circumferences of the steel end plate 5 and the outer conductor 8. The portion of the copper jacket 10 which extends over the steel end plate and the outer conductor may be secured to the end plate and outer conductor by welding, brazing or soldering. A copper cone 11 for reducing the housing diameter to that of the insulation of the cable over a long length so that the cone bends around the drum employed in laying the cable without kinking extends over a portion of the copper jacket 10. The cone 11 is preferably made of the same material as that of the jacket to prevent corrosion as a result of an electrocouple. The cone 11 may be soldered or brazed to the jacket 10. The space between the cone 11 and the cable insulation 9 is filled with a sealing compound 19, such as Chatterton compound or melted rubber, which is fluid at low temperatures.

A circuit connecting conductor 12 for connecting the apapratus contained within the housing to the cable is passed through the hollow central conductor 6. The wire 12 at the termination of the central conductor 6 in the housing is insulated by means of rubber or other suitable material 13. The insulation 13 is fixedly held to the insulator 7 by means of a metallic cone-like support 14. Electrical apparatus employed in undersea communication and indicated by the labeled block diagram in the drawing is connected at one lead to the circuit connecting wire 12 and at the other lead to a terminal 15 fixedly embedded in the steel end support 5 and in electrical contact with the outer conductor 8.

When the hollow central conductor 6 is joined to a central conductor 18 of a submarine cable the circuit connecting wire 12 is soldered or brazed to both the hollow conductor 6 and the central conductor 18 at the point of jointure of the hollow conductor 6 and central conductor 16. The central conductor 18 is surrounded by paragutta insulation 17, preferably comprising 40 per cent deresinated balata, 50 per cent deproteinized rubber and 10 per cent Superla wax. After joining the central conductors, paragutta 16 by the use of a joining machine is applied as a filler to complete the insulation of the central conductor between the housing and cable. The cone 11 is not inserted over the outer conductor 8 until after the jointure of the cable and housing is completed. After the cone is soldered, brazed or welded to the outer conductor, the space between the cone 11 and the insulations 9, 16 and 17 is filled with the sealing compound 19. To insure the absorption of any water that slowly enters the housing, a dehydrating agent such as calcium chloride, powdered alumina or silica gel may be placed within the housing.

The housing consists of the steel helix 4 surrounded by the jacket 10 and terminating at both ends with the detail shown in Fig. 2. The steel helix 4 is sufficient to withstand deep sea pressure, while the jacket 10 is impervious to water. Jute and armor may be applied to the housing as shown in Fig. 1. The end seals of the housing shown in Fig. 2 prevent the entrance of water into the housing at deep sea pressure.

Figure 3:
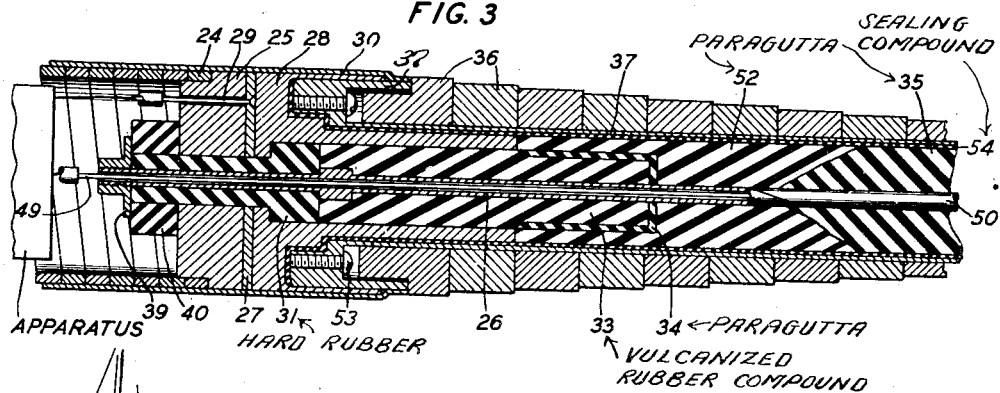

Fig. 3 shows another type of end seal employed for the housing illustrated in Fig. 1. The housing of which Fig. 3 comprises the end seal is an elongated steel helix over which a flexible jacket of copper or other metal which is impervious to water is placed. The elongated steel helix 24 fits into a steel end plate 25. A hollow central conductor 26 having a shoulder thereon is passed through the end plate 25. The conductor 26 also passes through a metallic outer conductor 28. The outer conductor 28 is electrically connected to a ground plate 27. A terminal 29 is connected to the ground plate and passes through the end plate 25 to be connected to apparatus within the housing. A hard rubber insulator 31 having a shoulder thereon separates the central conductor 26 from the steel end plate 25, the ground plate 27, and the outer conductor 28. The shoulder of the insulator 31 rests against the outer conductor 28, while the shoulder of the central conductor 26 rests against the insulator 31. The radial widths of both the insulator 31 and the central conductor 26 are sufficient to prevent, when subjected to deep sea pressures, appreciable extrusion of the insulator 31 through the outer conductor 28 or the extrusion of the conductor 26 through the insulator 31, respectively. The length of the shoulder of both the insulator 31 and the conductor 26 is sufficiently great to withstand deep sea pressures without shearing. The portion of the central conductor 26 between the insulator 31 and the end of the conductor is insulated from the outer conductor by a rubber compound 33. The rubber compound 33 is vulcanized to both the outer conductor 28 and the central conductor 26. The composition of a material which has been found satisfactory for the insulating compound 33 is as follows:

| | Parts |
|---|---|
| Deresinated balata | 40 |
| Deproteinized rubber | 50 |
| Superla wax | 10 |
| Age-rite resin (adol-alpha-naphthyl-amine) | 1 |
| Zinc oxide | 50 |
| Captax (mercapto-benzo-thiozole) | .5 |
| Stearic acid | .5 |
| Sulphur | 3 |
| Petrolatum | 5 |

The material known commercially as Superla wax and employed as an ingredient in the vulcanizing compound and the paragutta is a solid paraffin hydrocarbon wax derived from petroleum and having a melting point between 71° and 77° C. A range of materials having somewhat higher and somewhat lower melting points are also satisfactory. Reference is made to U. S. patent to Wendt and Banta 1,735,555, granted on November 12, 1929 for a further description of such waxes and their modes of preparation.

Since the vulcanizing compound does not adhere readily to the paragutta of the submarine cable after vulcanization, the portion of the compound 33 which extends beyond the outer conductor 28 is covered with paragutta 34. The paragutta consists of 40 parts of deresinated balata, 50 parts of deproteinized rubber and ten parts of Superla wax. In the vulcanization of the compound 33 the paragutta 34 adheres to the compound 33. The manner of vulcanizing the compound 33 is described in the copending application of W. M. Bishop Serial No. 71,411 filed of even date herewith. When the cable is spliced for connection to the housing, the paragutta of the cable adheres readily to the paragutta 34 of the housing. A central conductor 50 of a submarine cable is joined to the hollow conductor 26 of the housing. At the point of jointure, a circuit conducting wire 49 which passes through the hollow conductor 26 is soldered to both the central conductors 26 and 50. The central conductor 50 of the submarine cable is surrounded by paragutta insulation 35 of the same composition as that of the insulation 34. After jointure of the central conductors 26 and 50, insulation 52 comprising paragutta of the same composition as that of the insulation 34 and 35 is applied as a filler to complete the insulation of the central conductors between the cable and housing. After the central conductors have been jointed and the insulation 52 placed over the jointure, a sleeve 37 is fitted into the outer conductor 28 and covers the paragutta insulating material 35 for a considerable length.

In order to reduce gradually the diameter of the housing to that of the cable, a plurality of rings of solid metal 36 are employed. The rings 36 are gradually decreased in outside diameter from that of the housing to that of the insulation of the cable. The rings 36 may be made of metal tape instead of consisting of solid metal. The sleeve 37 supports the rings 36 and furnishes a long path for any sea water that might enter through the joint between the vulcanizing compound 33 and the outer conductor 28. The outer conductor 28 is provided with a plug 53 through which a sealing compound 54 may be inserted. The sealing compound is preferably a material, such as Chatterton's compound or melted rubber, which is fluid at low temperatures. The sealing compound 54 fills the spaces between the sleeve 37 and the outer conductor 28 and between the sleeve 37 and the insulators 35 and 52. A terminal nut 39 is fixedly attached to the central conductor 26 by means of threads. A hard rubber bushing 40 surrounds the insulator 31 to support the shoulder of the nut 39. One lead from the electrical apparatus inserted in the housing is connected to the ground plate 27 by the terminal 29, while the other lead from the apparatus is connected to the central conductor by means of the circuit conducting wire 49 which is soldered to the central conductor 26 at a point of jointure of the cable with the housing.

At both low and high sea pressures, the vulcanizing compound 33 prevents leakage of sea water between the insulator 31 and the outer conductor 28 and also leakage between the central conductor 26 and the insulator 31. At high sea pressure the construction of the shoulder on the central conductor and the shoulder on the insulator 31 prevents leakage of water between outer conductor 28 and the insulator 31 and between the central conductor 26 and the insulator 31.

A copper jacket 30 completely surrounds the steel helix 24 and extends over the end plate 25, the ground plate 27, the outer conductor 28 and a portion of the sleeve 37. The jacket 30 may be brazed, soldered or welded to the end plate 25, the ground plate 27, the outer conductor 28 and the sleeve 37. The housing including the end seal shown in Fig. 3 is covered with jute and armor wire as illustrated in Fig. 1.

Figure 4:
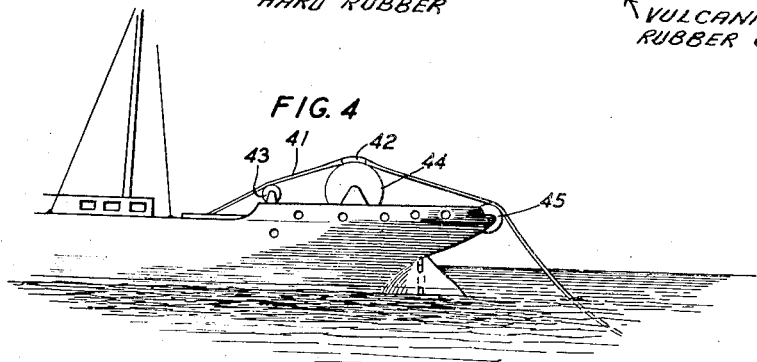
Fig. 4 is a perspective view of a vessel which illustrates the manner of laying a submarine cable connected to a housing constructed in accordance with this invention.

In Fig. 4 the laying of a submarine cable and the housing constructed in accordance with this invention is shown. In the laying of a cable for undersea communication, the cable usually passes over two sheaves and a drum. A cable 41 having a housing 42 in accordance with this invention connected to the cable passes over two sheaves 43 and 45 and a drum 44. The flexible nature of the housing permits the laying of the cable without the necessity of splicing of the cable on the cable ship for the connection of the housing.

While preferred embodiments of this invention have been illustrated and described, various modifications therein may be made without departing from the scope of the appended claims.

What is claimed is:

1. The combination of a deep sea cable having armoring with a deep sea housing for electrical apparatus, said housing comprising a flexible container capable of withstanding the pressures encountered at deep sea and a pliant covering about said container and supported thereby and which is impervious to water surrounding said container, said armoring being continued over said housing to relieve it of longitudinal strain.

2. A deep sea cable having armoring to take up longitudinal strain, a deep sea housing for electrical apparatus inserted in said cable, said housing comprising an elongated flexible tubular member, a pliant metal covering substantially impervious to water surrounding said housing and sealing means for substantially preventing water from entering either end of said housing, said tubular member being capable of supporting said covering under deep sea pressure and said armoring being continued over and surrounding said housing to relieve it of longitudinal strain.

3. A housing for electrical apparatus adapted to be laid on a sea bottom comprising a flexible container capable of withstanding the pressures encountered on the sea bottom, a pliant metallic covering surrounding said container which is substantially impervious to water, and a metallic member sealed to said container and said covering at one end of said housing and having a central opening for passing a cable conductor from the interior of said container and including sealing means about said conductor within said member for substantially preventing water from entering said container.

4. In an end seal for a submarine housing an outer conductor, and an inner conductor, a portion of said inner conductor passing through said outer conductor, an insulating material which adheres to said outer conductor and said inner conductor and which forms a seal for preventing the leakage of water into said housing and an insulating compound which adheres to said first insulating material, which surrounds a portion of said conductor not surrounded by said first material and which is capable of adhering to the insulation of a submarine cable.

5. A deep sea housing for electrical apparatus adapted to be built into a deep sea signaling cable which comprises a flexible container capable of withstanding deep sea pressures, end plates for said container each having a central opening and capable of withstanding deep sea pressures, a pliant impervious metal covering surrounding said container and sealed to said end plates, a conductor sealed by low pressure and high pressure sealing means into each of said openings and connected to the cable conductor, armoring about said container for relieving said container of longitudinal strain from the cable.

6. A deep sea entrance seal for passing a conductor into a low pressure housing having a rigid end plate with a hole, said seal comprising a plug of comparatively hard insulating material, such as hard rubber, fitted into said hole and having a shoulder engaging said plate for sealing under high pressure and also having a central bore, a conducting rod passing through said bore and having a shoulder engaging said plug for sealing under high pressure, a tubular extension from said end plate, and a comparatively soft insulating material, such as vulcanized rubber, filling the annular space between said extension and said rod and being vulcanized thereto for sealing under comparatively low pressures.

JESSE F. WENTZ.